(12) United States Patent
Kim et al.

(10) Patent No.: US 10,227,489 B2
(45) Date of Patent: Mar. 12, 2019

(54) THERMOPLASTIC RESIN COMPOSITION AND MOLDED ARTICLE USING THE SAME

(71) Applicant: Lotte Advanced Materials Co., Ltd., Yeosu-si (KR)

(72) Inventors: Myunghun Kim, Uiwang-si (KR); Keehae Kwon, Uiwang-si (KR); Jungeun Park, Uiwang-si (KR)

(73) Assignee: Lotte Advanced Materials Co., Ltd., Yeosu-si (KR)

( * ) Notice: Subject to any disclaimer, the term of this patent is extended or adjusted under 35 U.S.C. 154(b) by 0 days.

(21) Appl. No.: 15/855,369

(22) Filed: Dec. 27, 2017

(65) Prior Publication Data

US 2018/0187005 A1 Jul. 5, 2018

(30) Foreign Application Priority Data

Dec. 30, 2016 (KR) .................. 10-2016-0184426
Nov. 20, 2017 (KR) .................. 10-2017-0154947

(51) Int. Cl.
*C08L 69/00* (2006.01)

(52) U.S. Cl.
CPC .......... *C08L 69/00* (2013.01); *C08L 2201/08* (2013.01); *C08L 2205/025* (2013.01); *C08L 2205/035* (2013.01); *C08L 2207/53* (2013.01)

(58) Field of Classification Search
CPC .................. C08L 2205/035; C08L 69/00
See application file for complete search history.

(56) References Cited

U.S. PATENT DOCUMENTS

| 5,106,907 | A | * | 4/1992 | Boutni | ............. C08L 69/00 525/133 |
| 8,044,143 | B2 | | 10/2011 | Park et al. | |
| 2008/0242779 | A1 | * | 10/2008 | Gaggar | ............. C08L 33/12 524/261 |
| 2010/0168317 | A1 | | 7/2010 | Cahoon | |
| 2012/0065318 | A1 | | 3/2012 | Park et al. | |
| 2015/0099845 | A1 | * | 4/2015 | Daga | ............. C08L 69/00 524/506 |

FOREIGN PATENT DOCUMENTS

| CN | 105504753 A | 4/2016 |
| JP | 2621209 B2 | 6/1997 |
| JP | 10-298419 A | 11/1998 |
| JP | 2013-043908 A | 3/2013 |
| KR | 10-1995-0001641 A | 2/1995 |
| KR | 10-0252296 B1 | 4/2000 |
| KR | 10-2011-0111394 A | 10/2011 |
| KR | 10-1174089 B1 | 8/2012 |
| KR | 10-1266294 B1 | 5/2013 |
| KR | 10-2016-0062859 A | 6/2016 |
| KR | 10-2016-0129746 A | 11/2016 |

* cited by examiner

*Primary Examiner* — Christopher M Rodd
(74) *Attorney, Agent, or Firm* — Additon, Higgins & Pendleton, P.A.

(57) ABSTRACT

Disclosed are a thermoplastic resin composition including (A) about 100 parts by weight of a base resin including (A-1) about 65 wt % to about 85 wt % of a polycarbonate resin, (A-2) about 5 wt % to about 15 wt % of a polybutylene terephthalate resin, (A-3) about 5 wt % to about 20 wt % of a methyl methacrylate-styrene-acrylonitrile copolymer, and (A-4) greater than about 0 wt % and less than or equal to about 10 wt % of an aromatic vinyl compound-vinyl cyanide compound copolymer; and (B) about 5 parts by weight to about 10 parts by weight of a methyl methacrylate-butadiene-styrene copolymer, and a molded article using the same.

11 Claims, No Drawings

THERMOPLASTIC RESIN COMPOSITION AND MOLDED ARTICLE USING THE SAME

CROSS-REFERENCE TO RELATED APPLICATION

This application claims priority to and the benefit of Korean Patent Application Nos. 10-2016-0184426 and 10-2017-0154947 filed in the Korean Intellectual Property Office on Dec. 30, 2016 and Nov. 20, 2017, respectively, the entire disclosure of each of which is incorporated herein by reference.

FIELD

A thermoplastic resin composition and a molded article using the same are disclosed.

BACKGROUND

A polycarbonate resin is widely used as one of engineering plastics in a plastic industry. A polycarbonate resin can have a glass transition temperature (Tg) reaching about 150° C. due to a bulky molecular structure such as bisphenol-A and thus can have high heat resistance. Polycarbonate resins also can have flexibility and rigidity due to a carbonyl group of a carbonate group having high rotating mobility.

In addition, a polycarbonate resin is an amorphous polymer and thus can have excellent transparency characteristics. Further, a polycarbonate resin can have excellent impact resistance and compatibility with other resins and the like. Polycarbonate resins, however, can also have poor fluidity and thus may also be alloyed with various resins to improve workability and post processability.

Among the alloys, a polycarbonate/acrylonitrile-butadiene-styrene copolymer (PC/ABS) alloy can have excellent durability, formability, heat resistance, impact resistance, and the like and is applied to various fields such as electricity/electronics, automobiles, architecture, miscellaneous real life materials, and the like.

However, the PC/ABS alloy can lack resistance to chemicals used in cosmetics and air fresheners used inside a vehicle and thus may be damaged when used as an auto interior material.

A polyester resin can have excellent mechanical characteristics, electric characteristics, chemical resistance, and the like and particularly, a fast crystallization rate and thus excellent molding workability. Polyester resins, however, can have a low glass transition temperature and thus low heat resistance and also, low impact resistance at room temperature and a low temperature.

One attempt to improve chemical resistance of polycarbonate resins includes increasing the molecular weight of the polycarbonate resin. This can, however, deteriorate formability and thus limit the size of parts made using the same.

In addition, there have been efforts to use a polyester/polycarbonate (polyester/PC) alloy in which the polyester resin has a fast crystallization rate. As an amount of the polyester resin is increased, however, heat resistance is deteriorated, and a deviation in terms of appearance and mechanical properties may occur due to phase instability between the polyester and the polycarbonate.

Accordingly, there is a need for a thermoplastic resin composition having excellent chemical resistance, impact resistance, heat resistance, and formability compared with a conventional PC/ABS alloy and polyester/PC alloy.

SUMMARY OF THE INVENTION

A thermoplastic resin composition that can have improved chemical resistance, impact resistance, heat resistance, and/or formability and a molded article using the same are provided.

According to an embodiment, a thermoplastic resin composition includes (A) about 100 parts by weight of a base resin including (A-1) about 65 wt % to about 85 wt % of a polycarbonate resin, (A-2) about 5 wt % to about 15 wt % of a polybutylene terephthalate resin, (A-3) about 5 wt % to about 20 wt % of a methyl methacrylate-styrene-acrylonitrile copolymer, and (A-4) greater than about 0 wt % and less than or equal to about 10 wt % of an aromatic vinyl compound-vinyl cyanide compound copolymer; and (B) about 5 parts by weight to about 10 parts by weight of a methyl methacrylate-butadiene-styrene copolymer.

The (A-3) methyl methacrylate-styrene-acrylonitrile copolymer may be a copolymer of a monomer mixture including about 60 wt % to about 89 wt % of methyl methacrylate, about 10 wt % to about 39 wt % of styrene and greater than about 0 wt % and less than about 20 wt % of acrylonitrile.

The (A-3) methyl methacrylate-styrene-acrylonitrile copolymer may have a weight average molecular weight of about 50,000 g/mol to about 200,000 g/mol.

The (A-4) aromatic vinyl compound-vinyl cyanide compound copolymer may be a copolymer of a monomer mixture including about 50 wt % to about 90 wt % of the aromatic vinyl compound and about 10 wt % to about 50 wt % of the vinyl cyanide compound.

The (A-4) aromatic vinyl compound-vinyl cyanide compound copolymer may have a weight average molecular weight of about 100,000 g/mol to about 200,000 g/mol.

In the (A-4) aromatic vinyl compound-vinyl cyanide compound copolymer, the vinyl cyanide compound may be selected from acrylonitrile, methacrylonitrile, fumaronitrile, and a combination thereof.

In the (A-4) aromatic vinyl compound-vinyl cyanide compound copolymer resin, the aromatic vinyl compound may be selected from styrene, halogen- and/or C1 to C10 alkyl group-substituted styrene, α-methyl styrene, and a combination thereof.

The (A-4) aromatic vinyl compound-vinyl cyanide compound copolymer may be a styrene-acrylonitrile copolymer (SAN).

The (B) methyl methacrylate-butadiene-styrene copolymer may be a graft copolymer having a core-shell structure.

The core may consist of a butadiene-based rubbery polymer and the shell may be formed by graft polymerization of a copolymer of a methyl methacrylate monomer and a styrene monomer on the core.

A molded article using the thermoplastic resin composition according to an embodiment is provided.

The thermoplastic resin composition according to an embodiment and a molded article using the same can have excellent chemical resistance, impact resistance, heat resistance, and/or formability and thus may be widely applied in the production of various products regardless of painting or non-painting, for example thus may be usefully applied to an auto interior material and the like.

DETAILED DESCRIPTION

The above and other aspects, features, and advantages of the present invention will become apparent from the detailed description of the following embodiments. It should be understood that the present invention is not limited to the following embodiments and may be embodied in different ways by those skilled in the art without departing from the scope of the present invention. Rather, the embodiments are provided for complete disclosure and to provide thorough understanding of the present invention by those skilled in the art. The scope of the present invention should be defined only by the appended claims.

As used herein, when a specific definition is not otherwise provided, the term "substituted" refers to one substituted with a substituent selected from a halogen (F, Cl, Br, or I), a hydroxy group, a C1 to C20 alkoxy group, a nitro group, a cyano group, an amine group, an imino group, an azido group, an amidino group, a hydrazino group, a hydrazono group, a carbonyl group, a carbamyl group, a thiol group, an ester group, an ether group, a carboxyl group or a salt thereof, a sulfonic acid group or a salt thereof, a phosphoric acid group or a salt thereof, a C1 to C20 alkyl group, a C2 to C20 alkenyl group, a C2 to C20 alkynyl group, a C6 to C20 aryl group, a C3 to C20 cycloalkyl group, a C3 to C20 cycloalkenyl group, a C3 to C20 cycloalkynyl group, a C2 to C20 heterocycloalkyl group, a C2 to C20 heterocycloalkenyl group, a C2 to C20 heterocycloalkynyl group, a C3 to C20 heteroaryl group, or a combination thereof, instead of at least one hydrogen.

As used herein, when a specific definition is not otherwise provided, the term "hetero" refers to at least one heteroatom selected from N, O, S and/or P in a Chemical Formula.

According to an embodiment, a thermoplastic resin composition includes (A) about 100 parts by weight of a base resin including (A-1) about 65 wt % to about 85 wt % of a polycarbonate resin, (A-2) about 5 wt % to about 15 wt % of a polybutylene terephthalate resin, (A-3) about 5 wt % to about 20 wt % of a methyl methacrylate-styrene-acrylonitrile copolymer, and (A-4) greater than about 0 wt % and less than or equal to about 10 wt % of an aromatic vinyl compound-vinyl cyanide compound copolymer; and (B) about 5 parts by weight to about 10 parts by weight of a methyl methacrylate-butadiene-styrene copolymer.

Hereinafter, each component of the thermoplastic resin composition is described in detail.

(A) Base Resin
(A-1) Polycarbonate Resin

The polycarbonate resin is a polyester having a carbonate bond, is not particularly limited, and may be any polycarbonate that is usable in a field of a resin composition.

For example, the polycarbonate resin may be prepared by reacting one or more diphenols represented by Chemical Formula 1 with phosgene, halogenic acid ester, carbonate ester, or a combination thereof.

[Chemical Formula 1]

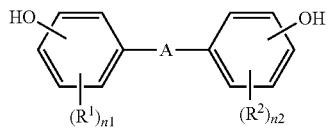

In Chemical Formula 1,

A is a linking group selected from a single bond, a substituted or unsubstituted C1 to C30 alkylene group, a substituted or unsubstituted C2 to C5 alkenylene group, a substituted or unsubstituted C2 to C5 alkylidene group, a substituted or unsubstituted C1 to C30 haloalkylene group, a substituted or unsubstituted C5 to C6 cycloalkylene group, a substituted or unsubstituted C5 to C6 cycloalkenylene group, a substituted or unsubstituted C5 to C10 cycloalkylidene group, a substituted or unsubstituted C6 to C30 arylene group, a substituted or unsubstituted C1 to C20 alkoxylene group, a halogenic acid ester group, a carbonate ester group, CO, S, and $SO_2$, $R^1$ and $R^2$ are the same or different and are each independently a substituted or unsubstituted C1 to C30 alkyl group or a substituted or unsubstituted C6 to C30 aryl group, and n1 and n2 are the same or different and are each independently an integer ranging from 0 to 4.

A diphenol represented by Chemical Formula 1 may be used singly or two or more kinds of diphenols represented by Chemical Formula 1 may be combined to constitute a repeating unit of a polycarbonate resin.

Examples of the diphenols may include without limitation hydroquinone, resorcinol, 4,4'-dihydroxydiphenyl, 2,2-bis(4-hydroxyphenyl)propane (referred to as 'bisphenol-A'), 2,4-bis(4-hydroxyphenyl)-2-methylbutane, bis(4-hydroxyphenyl)methane, 1,1-bis(4-hydroxyphenyl)cyclohexane, 2,2-bis(3-chloro-4-hydroxyphenyl)propane, 2,2-bis(3-methyl-4-hydroxyphenyl)propane, 2,2-bis(3,5-dimethyl-4-hydroxyphenyl)propane, 2,2-bis(3,5-dichloro-4-hydroxyphenyl)propane, 2,2-bis(3,5-dibromo-4-hydroxyphenyl)propane, bis(4-hydroxyphenyl)sulfoxide, bis(4-hydroxyphenyl)ketone, bis(4-hydroxyphenyl)ether, and the like, and mixtures thereof. For example, 2,2-bis(4-hydroxyphenyl)propane, 2,2-bis(3-methyl-4-hydroxyphenyl)propane, 2,2-bis(3,5-dimethyl-4-hydroxyphenyl)propane, 2,2-bis(3,5-dichloro-4-hydroxyphenyl)propane, and/or 1,1-bis(4-hydroxyphenyl)cyclohexane may be used. The polycarbonate resin may include a copolymer or a mixture of copolymers obtained using two or more dipenols that differ from each other.

In addition, the polycarbonate resin may include a linear polycarbonate resin, a branched polycarbonate resin, and/or a polyestercarbonate copolymer resin.

Examples of the linear polycarbonate resin may include a bisphenol-A polycarbonate resin. Examples of the branched polycarbonate resin may include a polymer prepared by reacting a multi-functional aromatic compound such as trimellitic anhydride, trimellitic acid, and the like with diphenol(s) and a carbonate. The polyester carbonate copolymer resin may be prepared by reacting bifunctional carboxylic acid with diphenol(s) and carbonate, wherein the carbonate can be diaryl carbonate such as diphenyl carbonate and/or ethylene carbonate.

The polycarbonate resin may have a weight average molecular weight of about 10,000 g/mol to about 200,000 g/mol, for example, about 14,000 g/mol to about 40,000 g/mol. When the polycarbonate resin has a weight average molecular weight within the above ranges, excellent impact resistance and/or fluidity may be obtained. In addition, two different kinds of the polycarbonate resin having a different weight average molecular weights and/or a different flow index may be mixed and used in order to satisfy desirable fluidity.

The polycarbonate resin may be included in an amount of about 65 wt % to about 85 wt %, for example, about 65 wt % to about 80 wt %, based on 100 wt % of the base resin. In some embodiments, the base resin may include the polycarbonate resin in an amount of about 65, 66, 67, 68, 69, 70, 71, 72, 73, 74, 75, 76, 77, 78, 79, 80, 81, 82, 83, 84, or 85 wt %. Further, according to some embodiments, the amount of the polycarbonate resin may be in a range from about any of the foregoing amounts to about any other of the foregoing amounts. When the polycarbonate resin is used in an amount of less than 65 wt %, appearance characteristics may not be sufficient, but when the polycarbonate resin is used in an amount of greater than 85 wt %, mechanical strength may be deteriorated.

(A-2) Polybutylene Terephthalate Resin

The polybutylene terephthalate resin is in general obtained through a polycondensation reaction of terephthalic acid and/or a derivative thereof with 1,4-butanediol and/or a derivative thereof.

In addition, other dicarboxylic acids and/or glycols may be copolymerized with the terephthalic acid/derivative thereof and/or the 1,4-butanediol/derivative thereof. Examples of the copolymerizable dicarboxylic acid may include without limitation isophthalic acid, 2-chloro terephthalic acid, 2,5-dichloroterephthalic acid, 2-methylterephthalic acid, 4,4-stilbenedicarboxylic acid, 4,4-biphenyldicarboxylic acid, orthophthalic acid, 2,6-naphthalene dicarboxylic acid, bisbenzoic acid, bis(p-carboxylphenyl) methane, anthracene dicarbonic acid, 4,4-diphenyletherdicarboxylic acid, 4,4-diphenoxyethanedicarbonic acid, adipic acid, sebacic acid, azelaic acid, dodecane diacid, 1,3-cyclohexanedicarboxylic acid, 1,4-cyclohexanedicarboxylic acid, and the like. The copolymerizable dicarboxylic acid may be used alone or as a mixture of two or more.

Examples of the copolymerizable glycol may include without limitation ethylene glycol, 1,2-propylene glycol, 1,3-propanediol, 2,2-dimethyl-1,3-propanediol, trans-2,2,4,4,-tetramethyl-1,3-cyclobutane diol, cis-2,2,4,4,-tetramethyl-1,3-cyclobutane diol, neopentylglycol, 1,5-pentanediol, 1,6-hexanediol, 1,4-cyclohexanedimethanol, 1,3-cyclohexanedimethanol, decamethylene glycol, cyclohexane diol, p-xylene diol, bisphenol A, tetrabromo bisphenol A, tetrabromo bisphenol A-bis (2-hydroxyethylether), and the like. The copolymerizable glycol may be used alone or as a mixture of two or more.

The polybutylene terephthalate resin may have inherent viscosity ranging from about 0.7 to about 1.50 dl/g, which is measured at 25° C. by using an o-chloro phenol solvent, in order to sufficiently secure impact resistance of a molded article formed by using a thermoplastic resin composition.

The polybutylene terephthalate resin according to an embodiment may be included in an amount of about 5 wt % to about 15 wt %, for example, about 5 wt % to about 10 wt %, based on 100 wt % of the base resin. In some embodiments, the base resin may include the polybutylene terephthalate resin in an amount of about 5, 6, 7, 8, 9, 10, 11, 12, 13, 14, or 15 wt %. Further, according to some embodiments, the amount of the polybutylene terephthalate resin may be in a range from about any of the foregoing amounts to about any other of the foregoing amounts. When the polybutylene terephthalate resin is included within in an amount the above ranges, the thermoplastic resin composition may have excellent chemical resistance.

In contrast, when the polybutylene terephthalate resin is included in an amount of less than about 5 wt % based on 100 wt % of the base resin, painting and/or appearance characteristics, for example, a weldline on a resin molded article and the like can be deteriorated. In addition, when polybutylene terephthalate resin is included in an amount of greater than about 15 wt % based on 100 wt % of the base resin, heat resistance and/or low temperature impact resistance can be deteriorated, and a color stain may be generated.

(A-3) Methyl Methacrylate-Styrene-Acrylonitrile Copolymer

A methyl methacrylate-styrene-acrylonitrile copolymer can improve compatibility of a polycarbonate resin with a polybutylene terephthalate resin and is a terpolymer of methyl methacrylate, styrene, and acrylonitrile.

The (A-3) methyl methacrylate-styrene-acrylonitrile copolymer may be a copolymer of a monomer mixture including about 60 wt % to about 89 wt % of methyl methacrylate, about 10 wt % to about 39 wt % of styrene and greater than about 0 wt % and less than about 20 wt % of acrylonitrile.

In some embodiments, the monomer mixture may include methyl methacrylate in an amount of about 60, 61, 62, 63, 64, 65, 66, 67, 68, 69, 70, 71, 72, 73, 74, 75, 76, 77, 78, 79, 80, 81, 82, 83, 84, 85, 86, 87, 88, or 89 wt %. Further, according to some embodiments, the amount of methyl methacrylate may be in a range from about any of the foregoing amounts to about any other of the foregoing amounts.

In some embodiments, the monomer mixture may include styrene in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, or 39 wt %. Further, according to some embodiments, the amount of styrene may be in a range from about any of the foregoing amounts to about any other of the foregoing amounts.

In some embodiments, the monomer mixture may include acrylonitrile in an amount of about 0 (greater than 0), 1, 2, 3, 4, 5, 6, 7, 8, 9, 10, 11, 12, 13, 14, 15, 16, 17, 18, or 19 wt %. Further, according to some embodiments, the amount of acrylonitrile may be in a range from about any of the foregoing amounts to about any other of the foregoing amounts.

When the components of the methyl methacrylate-styrene-acrylonitrile copolymer have a ratio satisfying the above ranges, compatibility between the polycarbonate resin and the polybutylene terephthalate resin may be improved.

The methyl methacrylate-styrene-acrylonitrile copolymer may have a weight average molecular weight of about 50,000 g/mol to about 200,000 g/mol, for example about 60,000 g/mol to about 200,000 g/mol, for example about 70,000 g/mol to about 180,000 g/mol, for example about 80,000 g/mol to about 160,000 g/mol, for example about 80,000 g/mol to about 140,000 g/mol, for example about 80,000 g/mol to about 120,000 g/mol, for example about 90,000 g/mol to about 110,000 g/mol. When the methyl methacrylate-styrene-acrylonitrile copolymer has a weight average molecular weight within the above ranges, a morphology among the components may be improved without damaging fluidity of the resin composition in a shear rate area during the injection molding.

The methyl methacrylate-styrene-acrylonitrile copolymer may be included in an amount of about 5 wt % to about 20 wt %, for example, about 5 wt % to about 15 wt %, based on 100 wt % of the base resin. In some embodiments, the base resin may include the methyl methacrylate-styrene-acrylonitrile copolymer in an amount of about 5, 6, 7, 8, 9, 10, 11, 12, 13, 14, 15, 16, 17, 18, 19, or 20 wt %. Further, according to some embodiments, the amount of the methyl methacrylate-styrene-acrylonitrile copolymer may be in a range from about any of the foregoing amounts to about any other of the foregoing amounts. When the methyl methacrylate-styrene-acrylonitrile copolymer is included in an amount of less than about 5 wt %, compatibility between the polycarbonate resin and the polybutylene terephthalate resin may be deteriorated, but when the methyl methacrylatestyrene-acrylonitrile copolymer is included in an amount of greater than about 20 wt %, the resin composition can be difficult to process due to deteriorated fluidity of the resin composition.

(A-4) Aromatic Vinyl Compound-Vinyl Cyanide Compound Copolymer

The aromatic vinyl compound-vinyl cyanide compound copolymer is formed by copolymerization of a vinyl cyanide compound and an aromatic vinyl compound.

Examples of the vinyl cyanide compound may include without limitation acrylonitrile, methacrylonitrile, fumaronitrile, and the like, and combinations thereof.

Examples of the aromatic vinyl compound may include without limitation styrene, halogen- and/or C1 to C10 alkyl group-substituted styrene, α-methyl styrene, and the like, and combinations thereof.

The aromatic vinyl compound-vinyl cyanide compound copolymer may be a styrene-acrylonitrile copolymer (SAN).

The aromatic vinyl compound-vinyl cyanide compound copolymer may be a copolymer of a monomer mixture including about 50 wt % to about 90 wt % of the aromatic vinyl compound and about 10 wt % to about 50 wt % of the vinyl cyanide compound.

In some embodiments, the monomer mixture may include the aromatic vinyl compound in an amount of about 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or 90 wt %. Further, according to some embodiments, the amount of the aromatic vinyl compound may be in a range from about any of the foregoing amounts to about any other of the foregoing amounts.

In some embodiments, the monomer mixture may include the vinyl cyanide compound in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 wt %. Further, according to some embodiments, the amount of the vinyl cyanide compound may be in a range from about any of the foregoing amounts to about any other of the foregoing amounts.

The aromatic vinyl compound-vinyl cyanide compound copolymer may have a weight average molecular weight of about 100,000 g/mol to about 200,000 g/mol, for example about 110,000 g/mol to about 190,000 g/mol, for example about 120,000 g/mol to about 180,000 g/mol, for example about 130,000 g/mol to about 170,000 g/mol.

The aromatic vinyl compound-vinyl cyanide compound copolymer may be included in an amount of greater than about 0 and less than or equal to about 10 wt %, for example, about 5 wt % to about 10 wt %, based on 100 wt % of the base resin. In some embodiments, the base resin may include the aromatic vinyl compound-vinyl cyanide compound copolymer in an amount of about 0 (greater than 0), 1, 2, 3, 4, 5, 6, 7, 8, 9, or 10 wt %. Further, according to some embodiments, the amount of the aromatic vinyl compound-vinyl cyanide compound copolymer may be in a range from about any of the foregoing amounts to about any other of the foregoing amounts. When the aromatic vinyl compound-vinyl cyanide compound copolymer is used in an amount outside of the above range, impact resistance and/or chemical resistance may be deteriorated, as compatibility of the polycarbonate resin and the polybutylene terephthalate resin with the methyl methacrylate-butadiene-styrene copolymer may be deteriorated.

(B) Methyl Methacrylate-Butadiene-Styrene Copolymer

The methyl methacrylate-butadiene-styrene copolymer may be a graft copolymer having a core-shell structure.

The methyl methacrylate-butadiene-styrene copolymer may have a core formed of a butadiene-based rubbery polymer and a shell formed of a copolymer of a methyl methacrylate monomer and a styrene monomer which is graft-polymerized on the core.

The rubbery polymer comprising the core can improve impact resistance particularly at a low temperature, and the shell component is positioned on a continuous phase, for example, on the interface of the aromatic vinyl compound-vinyl cyanide compound copolymer and the rubbery polymer and thus may reduce an interface tension and decrease a particle size of the rubbery polymer on a dispersion phase and on the other hand, improve adherence on the interface.

The methyl methacrylate-butadiene-styrene copolymer may be included in an amount of about 5 to about 10 parts by weight, for example, about 6 to about 9 parts by weight, based on about 100 parts by weight of the base resin. In some embodiments, the thermoplastic resin composition may include the methyl methacrylate-butadiene-styrene copolymer in an amount of about 5, 6, 7, 8, 9, or 10 parts by weight. Further, according to some embodiments, the amount of the methyl methacrylate-butadiene-styrene copolymer may be in a range from about any of the foregoing amounts to about any other of the foregoing amounts.

When the methyl methacrylate-butadiene-styrene copolymer is included in an amount within the above ranges, low temperature impact resistance of the thermoplastic resin composition may be improved.

(C) Other Additives

The thermoplastic resin composition may further include one or more additives optionally in accordance with its use. Examples of the additives may include without limitation flame retardants, lubricants, plasticizers, heat stabilizers, antioxidants, light stabilizers, and/or colorants and two or more kinds may be mixed in accordance with characteristics of final molded articles.

The flame retardant is a material for reducing flammability and may include at least one of a phosphate compound, a phosphite compound, a phosphonate compound, a polysiloxane, a phosphazene compound, a phosphinate compound, and/or a melamine compound, but is not limited thereto.

The lubricant plays a role of smoothening the surface of a metal contacting with the thermoplastic resin composition during the process/molding/extrusion and thus helping a flow or movement of the thermoplastic resin composition.

The plasticizer may be generally used to increase flexibility, process workability, and/or expansion property of the thermoplastic resin composition.

The heat stabilizer may suppress a thermal decomposition of the thermoplastic resin composition when kneaded and/or molded at a high temperature.

The antioxidant may suppress and/or block a chemical reaction of the thermoplastic resin composition with oxygen and thus prevent decomposition of the thermoplastic resin composition and loss of its inherent properties and can include at least one of phenol-type, phosphate-type, thioether-type, and/or amine-type antioxidants, but is not limited thereto.

The light stabilizer suppresses and/or blocks decomposition of the thermoplastic resin composition from ultraviolet (UV) and thus its color change and/or mechanical property loss and may include at least one of hindered phenol type, benzophenone type, and/or benzotriazole type light stabilizers, but is not limited thereto.

The colorant may include a general pigment and/or dye.

The additives when present may be included in an amount of about 0.1 parts by weight to about 15 parts by weight based on about 100 parts by weight of the base resin.

The thermoplastic resin composition according to the present disclosure may be prepared in a well-known method of preparing a thermoplastic resin composition.

For example, the thermoplastic resin composition according to the present disclosure may be manufactured into a pellet by mixing components and other additives simultaneously and melt-kneading the same in an extruder.

A molded article according to an example embodiment of the present disclosure may be manufactured from the thermoplastic resin composition. The thermoplastic resin composition can have excellent chemical resistance, heat resistance, and/or impact resistance and also excellent formability and thus may be used in the production of a molded article requiring for example chemical resistance such as but not limited to an auto interior material requiring chemical resistance to cosmetics, air fresheners, etc.

Hereinafter, the present disclosure is illustrated in more detail with reference to examples and comparative examples. However, the following examples and comparative examples are provided for the purpose of illustration only and the present disclosure is not limited thereto.

These examples are not in any sense to be interpreted as limiting the scope of the invention.

Examples 1 and 2 and Comparative Examples 1 to 5

The polycarbonate resin compositions according to Examples 1 and 2 and Comparative Examples 1 to 5 are respectively prepared according to the amounts of components shown in Table 1.

In Table 1, the amounts of components comprising the base resin are reported as wt % based on an entire weight of the base resin, and the amounts of an acrylonitrile-butadiene-styrene copolymer, a methyl methacrylate-acrylonitrile-butadiene-styrene copolymer, and a methyl methacrylate-butadiene-styrene copolymer added to the base resin are reported as parts by weight based on 100 parts by weight of the base resin.

The components shown in Table 1 are dry-mixed, consecutively dispensed quantitatively in a feed section of a twin-screw extruder (L/D=29, φ=45 mm), and melted/kneaded. Subsequently, a thermoplastic resin composition prepared into a pellet through the twin-screw extruder is dried at about 80° C. for about 2 hours, and the pellet is injection-molded into a specimen for evaluating properties and a 2 mm-thick specimen for evaluating chemical resistance through a 6 oz injection molder by setting a cylinder temperature at about 260° C. and a molder temperature at about 60° C.

TABLE 1

|  | Unit | Ex. 1 | Ex. 2 | Comp. Ex. 1 | Comp. Ex. 2 | Comp. Ex. 3 | Comp. Ex. 4 | Comp. Ex. 5 |
| --- | --- | --- | --- | --- | --- | --- | --- | --- |
| (A-1-1) | wt % | 30 | 30 | 30 | 30 | 30 | 30 | 30 |
| (A-1-2) | wt % | 45 | 45 | 45 | 45 | 45 | 45 | 45 |
| (A-2) | wt % | 10 | 0 | 10 | — | — | 10 | 10 |
| (A-3) | wt % | 10 | 5 | — | 25 | — | 15 | 15 |
| (A-4) | wt % | 5 | 10 | 15 | — | 25 | — | — |

TABLE 1-continued

|  | Unit | Ex. 1 | Ex. 2 | Comp. Ex. 1 | Comp. Ex. 2 | Comp. Ex. 3 | Comp. Ex. 4 | Comp. Ex. 5 |
| --- | --- | --- | --- | --- | --- | --- | --- | --- |
| (B) | parts by weight | 8 | 8 | 8 | 8 | 8 | — | — |
| (C-1) | parts by weight | — | — | — | — | — | — | 8 |
| (C-2) | parts by weight | — | — | — | — | — | 8 | — |

Each component shown in Table 1 is illustrated as follows.

(A) Base Resin (A-1) Polycarbonate Resin (A-1-1) First Polycarbonate Resin

A polycarbonate resin having a melt flow index of 6.0 g/10 min under a load of 1.2 kg at 300° C. according to ASTM D1238 (Lotte Advanced Materials Co., Ltd.)

(A-1-2) Second Polycarbonate Resin

A polycarbonate resin having a melt flow index of 18.0 g/10 min under a load of 1.2 kg at 300° C. according to ASTM D1238 (Lotte Advanced Materials Co., Ltd.)

(A-2) Polybutylene Terephthalate Resin

A polybutylene terephthalate resin having inherent viscosity of 1.20 dl/g measured by using o-chloro phenol solvent at 25° C. (DHK 011, Shinkong Synthetic Fibers Corp.)

(A-3) Methyl Methacrylate-Styrene-Acrylonitrile Copolymer

A methyl methacrylate-styrene-acrylonitrile copolymer including 5 wt % acrylonitrile, 20 wt % styrene, and 75 wt % methyl methacrylate and having a weight average molecular weight of about 100,000 g/mol (Lotte Advanced Materials Co., Ltd.)

(A-4) Aromatic Vinyl Compound-Vinyl Cyanide Compound Copolymer

A styrene-acrylonitrile copolymer including 31 wt % acrylonitrile and 69 wt % styrene and having a weight average molecular weight of about 150,000 g/mol (Lotte Advanced Materials Co., Ltd.)

(B) Methyl Methacrylate-Butadiene-Styrene Copolymer

A methyl methacrylate-butadiene-styrene graft copolymer having a core-shell structure wherein a methyl methacrylate-styrene copolymer is graft polymerized into a polybutadiene rubber core (Metablen C223-A, MRC Global Inc.)

(C-1) Acrylonitrile-Butadiene-Styrene Copolymer

An acrylonitrile-butadiene-styrene graft copolymer having a core-shell structure wherein an acrylonitrile-styrene copolymer is graft polymerized into a polybutadiene rubber core, wherein the rubber has an average particle diameter of about 300 nm (Lotte Advanced Materials Co., Ltd.)

(C-2) Methyl Methacrylate-Acrylonitrile-Butadiene-Styrene Copolymer

A methyl methacrylate-acrylonitrile-butadiene-styrene graft copolymer having a graft polymerized core-shell structure wherein a methyl methacrylate-acrylonitrile-styrene copolymer is graft polymerized into a polybutadiene rubber core, wherein the rubber has an average particle diameter of about 240 nm (Lotte Advanced Materials Co., Ltd.)

Experimental Examples

Experimental results are shown in Table 2.

(1) Fluidity (g/10 min): A melt flow index (MI) is measured under a load of 2.16 kg at 250° C. according to ASTM D1238.

(2) Heat Resistance (° C.): A heat deflection temperature (HDT) is measured under a load of 18.5 kg according to ASTM D648

(3) Impact Resistance (kgf·cm/cm): Notch Izod Impact strength of a ¼"-thick specimen is measured at room temperature according to ASTM D256

(4) Chemical Resistance: evaluated by mounting an ASTM D638 Type I specimen on a zig of a critical deformation of 2.1%, coating a chemical on the surface of the specimen, and allowing it to stand at room temperature for 168 hours. If the specimen breaks in the chemical resistance evaluation, a rating of 'Inferior' is given, and if the specimen does not change (break), a rating of 'Good' is given.

TABLE 2

|  | Ex. 1 | Ex. 2 | Comp. Ex. 1 | Comp. Ex. 2 | Comp. Ex. 3 | Comp. Ex. 4 | Comp. Ex. 5 |
|---|---|---|---|---|---|---|---|
| Melt Index | 4.2 | 4.0 | 4.6 | 3.0 | 3.5 | 4.2 | 4.2 |
| HDT | 109 | 110 | 108 | 120 | 117 | 112 | 112 |
| Izod Impact strength | 58 | 58 | 53 | 45 | 40 | 48 | 43 |
| Chemical resistance | Good | Good | Inferior | Inferior | Inferior | Good | Good |

Referring to Tables 1 and 2, a thermoplastic resin composition exhibiting excellent fluidity, heat resistance, impact resistance, and chemical resistance as well as securing phase stability between a polycarbonate resin and a polybutylene terephthalate resin is realized by using the polycarbonate resin, the polybutylene terephthalate resin, a methyl methacrylate-styrene-acrylonitrile copolymer, a styrene-acrylonitrile copolymer, and a methyl methacrylate-butadiene-styrene copolymer respectively in an optimal amount.

Many modifications and other embodiments of the invention will come to mind to one skilled in the art to which this invention pertains having the benefit of the teachings presented in the foregoing description. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

What is claimed is:

1. A thermoplastic resin composition, comprising:
   (A) about 100 parts by weight of a base resin including:
   (A-1) about 65 wt % to about 85 wt % of a polycarbonate resin;
   (A-2) about 5 wt % to about 15 wt % of a polybutylene terephthalate resin,
   (A-3) about 5 wt % to about 20 wt % of a methyl methacrylate-styrene-acrylonitrile copolymer; and
   (A-4) greater than about 0 wt % and less than or equal to about 10 wt % of an aromatic vinyl compound-vinyl cyanide compound copolymer; and
   (B) about 5 parts by weight to about 10 parts by weight of a methyl methacrylate-butadiene-styrene copolymer.

2. The thermoplastic resin composition of claim 1, wherein the (A-3) methyl methacrylate-styrene-acrylonitrile copolymer is a copolymer of a monomer mixture including about 60 wt % to about 89 wt % of methyl methacrylate, about 10 wt % to about 39 wt % of styrene and greater than about 0 wt % and less than about 20 wt % of acrylonitrile.

3. The thermoplastic resin composition of claim 1, wherein the (A-3) methyl methacrylate-styrene-acrylonitrile copolymer has a weight average molecular weight of about 50,000 g/mol to about 200,000 g/mol.

4. The thermoplastic resin composition of claim 1, wherein the (A-4) aromatic vinyl compound-vinyl cyanide compound copolymer is a copolymer of a monomer mixture including about 50 wt % to about 90 wt % of the aromatic vinyl compound and about 10 wt % to about 50 wt % of the vinyl cyanide compound.

5. The thermoplastic resin composition of claim 1, wherein the (A-4) aromatic vinyl compound-vinyl cyanide compound copolymer has a weight average molecular weight of about 100,000 g/mol to about 200,000 g/mol.

6. The thermoplastic resin composition of claim 1, wherein in the (A-4) aromatic vinyl compound-vinyl cyanide compound copolymer,
   the vinyl cyanide compound comprises acrylonitrile, methacrylonitrile, fumaronitrile, or a combination thereof.

7. The thermoplastic resin composition of claim 1, wherein in the (A-4) aromatic vinyl compound-vinyl cyanide compound copolymer,
   the aromatic vinyl compound comprises styrene, halogen- and/or C1 to C10 alkyl group-substituted styrene, α-methyl styrene, or a combination thereof.

8. The thermoplastic resin composition of claim 1, wherein the (A-4) aromatic vinyl compound-vinyl cyanide compound copolymer is a styrene-acrylonitrile copolymer (SAN).

9. The thermoplastic resin composition of claim 1, wherein the (B) methyl methacrylate-butadiene-styrene copolymer is a graft copolymer having a core-shell structure.

10. The thermoplastic resin composition of claim 9, wherein the core consists of a butadiene-based rubbery polymer, and
   the shell is formed by graft polymerization of a copolymer of a methyl methacrylate monomer and a styrene monomer on the core.

11. A molded article using the thermoplastic resin composition of claim 1.

* * * * *